United States Patent
Li et al.

(10) Patent No.: US 10,312,701 B2
(45) Date of Patent: Jun. 4, 2019

(54) CHARGING METHOD AND PORTABLE ELECTRONIC DEVICE USING THE SAME

(71) Applicant: ASUSTeK COMPUTER INC., Taipei (TW)

(72) Inventors: Ching-Han Li, Taipei (TW);
Hsiang-Jui Hung, Taipei (TW);
Wei-Chen Tu, Taipei (TW); Ming-Ting Tsai, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 631 days.

(21) Appl. No.: 15/003,779

(22) Filed: Jan. 21, 2016

(65) Prior Publication Data
US 2016/0218531 A1     Jul. 28, 2016

(30) Foreign Application Priority Data

Jan. 23, 2015  (TW) .............................. 104102322 A

(51) Int. Cl.
H02J 7/00       (2006.01)
(52) U.S. Cl.
CPC .......... *H02J 7/0029* (2013.01); *H02J 7/0073* (2013.01); *H02J 2007/0037* (2013.01)
(58) Field of Classification Search
CPC . H02J 7/0029; H02J 7/0073; H02J 2007/0037
USPC ....................................................... 320/107
See application file for complete search history.

(56) References Cited

U.S. PATENT DOCUMENTS

| | | | |
|---|---|---|---|
| 3,624,481 A | 11/1971 | Macharg | |
| 7,262,587 B2* | 8/2007 | Takimoto | H02M 1/36 323/222 |
| 8,222,867 B2* | 7/2012 | Wang | G06F 1/203 320/134 |
| 9,184,607 B2* | 11/2015 | Su | H02J 7/0031 |
| 9,979,220 B2* | 5/2018 | Jung | H02J 7/007 |
| 2006/0132091 A1* | 6/2006 | Felder | H02J 7/0086 320/128 |
| 2009/0153100 A1* | 6/2009 | Okumura | H02J 7/0026 320/116 |

(Continued)

FOREIGN PATENT DOCUMENTS

| | | |
|---|---|---|
| CN | 102055229 | 5/2011 |
| CN | 103794827 | 5/2014 |

*Primary Examiner* — M Baye Diao
(74) *Attorney, Agent, or Firm* — JCIPRNET

(57) ABSTRACT

A charging method of a portable electronic device, adapted to charge a battery module of a portable electronic device, the charging method comprising detecting a battery voltage and a charging current of the battery module; determining whether the portable electronic device operates at a constant current mode according to the battery voltage; entering an over voltage protection charging loop while the portable electronic device operates at the constant current mode and allows the battery module to be charged up at a maximum charging voltage, and leaving the over voltage protection charging loop while the charging current is smaller than a predetermined current, wherein the maximum charging voltage is gradually decreased according to a comparison result between the battery voltage and an overcharging protection voltage; and setting the maximum charging voltage as a full charge voltage while leaving the over voltage protection charging loop.

18 Claims, 4 Drawing Sheets

(56) References Cited

U.S. PATENT DOCUMENTS

2011/0101925 A1 5/2011 Lai
2012/0268068 A1* 10/2012 Jung .................... H01M 10/44
  320/109
2016/0344218 A1* 11/2016 Zhang .................... H02J 7/045

* cited by examiner

CHARGING METHOD AND PORTABLE ELECTRONIC DEVICE USING THE SAME

CROSS-REFERENCE TO RELATED APPLICATION

This application claims the priority benefit of Taiwan application serial No. 104102322, filed on Jan. 23, 2015. The entirety of the above-mentioned patent application is hereby incorporated by references herein and made a part of specification.

BACKGROUND OF THE INVENTION

Field of the Invention

The disclosure relates to a power charging method and, more particularly, relates to a charging method and a portable electronic apparatus using the same.

Description of the Related Art

With the development of technology in recent years, various portable electronic apparatus, such as a tablet computer, a person digital assistant, a laptop computers and smart phones, are necessary tools in life.

A battery with large capacity needs long time to be charged up. Thus, to recharge the battery with large capacity in a short time, the charge efficiency must be improved.

In general, the battery is charged up via a pre-charge mode when the electric quantity is low. While the electric quantity of battery achieves a predetermined value, the charge mode is switched to a constant current mode, and then while the voltage of the battery approaches to the full-charge voltage, the charge mode is switched again to a constant voltage charge mode to charge the battery until the battery is fully charged.

Using the constant current mode to charge up a battery is faster than using the constant voltage charge mode, in which the constant current and the constant voltage are determined according to the voltage of the battery. However, the measured voltage of the battery is not reflecting a real voltage of the battery that is caused by the battery inner resistance. Thus general charging control module is switched to the constant voltage mode before the real voltage of the battery achieving to predetermined fully charging voltage, thus the charging velocity of the battery is reduced.

BRIEF SUMMARY OF THE INVENTION

According to a first aspect of the present disclosure, a charging method of a portable electronic device, adapted to charge a battery module of a portable electronic device is disclosed. The charging method comprises detecting a battery voltage and a charging current of the battery module; determining whether the portable electronic device operates at a constant current mode according to the battery voltage; entering an over voltage protection charging loop while the portable electronic device operates at the constant current mode and allows the battery module to be charged up at a maximum charging voltage, and leaving the over voltage protection charging loop while the charging current is smaller than a predetermined current, wherein the maximum charging voltage is gradually decreased according to a comparison result between the battery voltage and an overcharging protection voltage; and setting the maximum charging voltage as a full charge voltage while leaving the over voltage protection charging loop.

constant current modeconstant current modeFurthermore, according to a second aspect of the present disclosure, a portable electronic device, comprising a function module; a battery module coupled to the function module, configured to charge the function module; and a charging control module coupled to the battery module, configured to charge the battery module, wherein the charging control module detects a battery voltage and a charging current of the battery module and determines whether the portable electronic device operates at a constant current mode according to the battery voltage, while the portable electronic device operates at the constant current mode, the charging control module enters an OVP charging loop to allow the battery module to be charged with a constant current according to a maximum charging voltage until the charging current is smaller than a predetermined current, the charging control module leaves the OVP charging loop while the charging current is smaller than a predetermined current, and the maximum charging voltage is set as a full charge voltage while the OVP charging loop is left, wherein in the OVP charging loop, the charging control module gradually decreases a setting value of the maximum charging voltage according to a comparison result between the battery voltage and an overcharging protection voltage.

BRIEF DESCRIPTION OF THE DRAWINGS

These and other features, aspects and advantages of the disclosure will become better understood with regard to the following embodiments and accompanying drawings.

DETAILED DESCRIPTION OF THE EMBODIMENTS

In embodiments and figures, the same and similar number denotes the same and similar components/steps.

Figure 1:
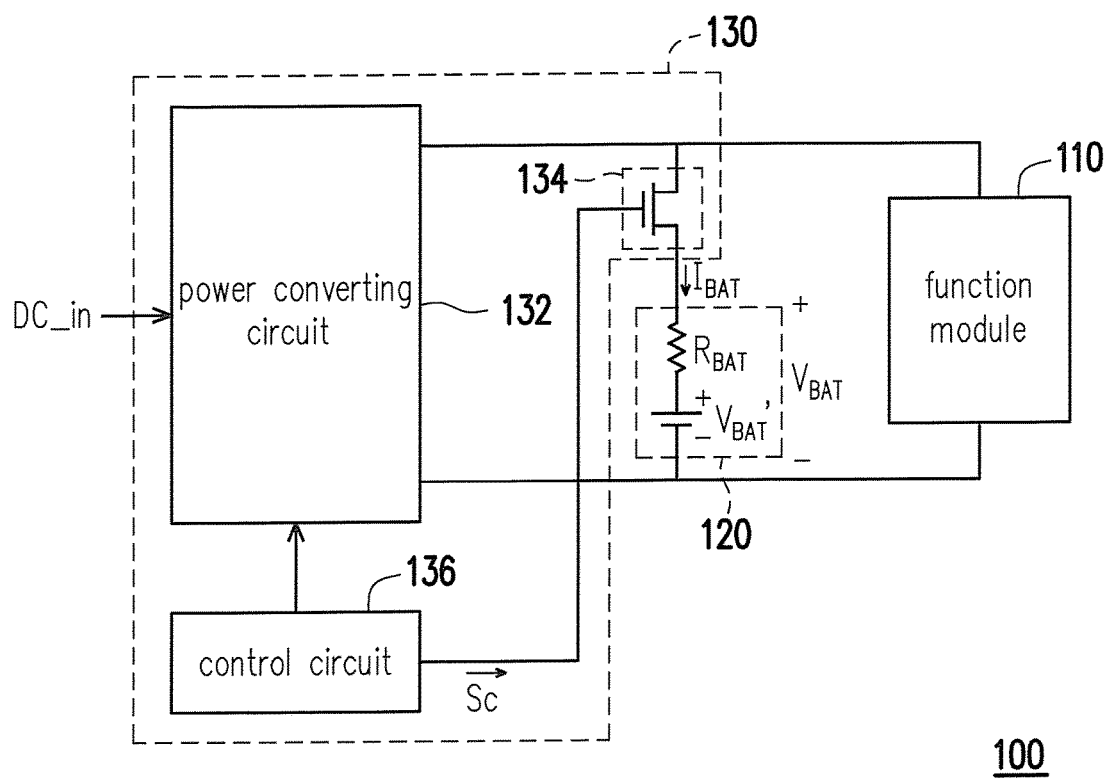
FIG. 1 is a schematic diagram showing a portable electronic device in an embodiment.

FIG. 1 is a schematic diagram showing a portable electronic device in an embodiment. As shown in FIG. 1, a portable electronic device 100 is adapted to receive a DC power source DC_in (in an embodiment, the DC power source DC_in is provided by a power adapter) from outside, and then the DC power source DC_in is converted to an operational power source for the operation of internal circuit and the charge of the battery module. In embodiments, the portable electronic device 100 is a notebook, a tablet computer, a smartphone, a PDA, or a game machine, which is not limited herein.

In the embodiment, the portable electronic device 100 gets AC power (such as a main power) from a power adapter (not shown), and the AC power is used as the power source for the operation and charging of the portable electronic device 100.

In the embodiment, the portable electronic device 100 includes a function module 110, a battery module 120, and a charging control module 130. The function module 110 is hardware of the portable electronic device 100 for providing a specific function, such as a CPU, a chipset, a memory, a hard disk. The battery module 120 is a power source for the portable electronic device 100 when the portable electronic device 100 is not connected to an external power source via a power adapter. When the portable electronic device 100 is connected to the external AC power source, the battery module 120 is charged under the control of the charging control module 130.

The charging control module 130 is coupled to the battery module 120. The charging control module 130 is used to receive the power from the power adapter to provide the power to the function module 110 or charge the battery module 120 when the power adapter is connected to an input terminal of the power source. In the charging to the battery module 120, the charging control module 130 detects a battery voltage VBAT and a charging current IBAT of the battery module 120, and then the set maximum charging voltage is dynamically adjusted in the constant current mode (the CC mode), the impedance effect due to the internal resistance (such as RBAT) of the battery module 120 is reduced to improve the charging speed.

In the embodiment, the charging control module 130 includes a power converting circuit 132, a power switch 134, and a control circuit 136. The power converting circuit 132 receives the DC power source DC_in, and the power converting circuit 132 is controlled by the control circuit 136 to convert the DC power source DC_in to the operational power source. The power switch 134 is coupled to the power converting circuit 132 to receive the operational power source. The power switch 134 switches according to the control signal Sc from the control circuit 136 to control the operational power source to the battery module 120, and then the charging mode of the battery module 120 is changed according to the control signal Sc of the control circuit 136. The control circuit 136 is used for controlling the power conversion of the power converting circuit 132, and the control circuit 136 provides the control signal Sc to switch the power switch 134. The control circuit 136 detects the battery voltage VBAT and the charging current IBAT of the battery module 120 for adjusting the control signal Sc.

Figure 2:
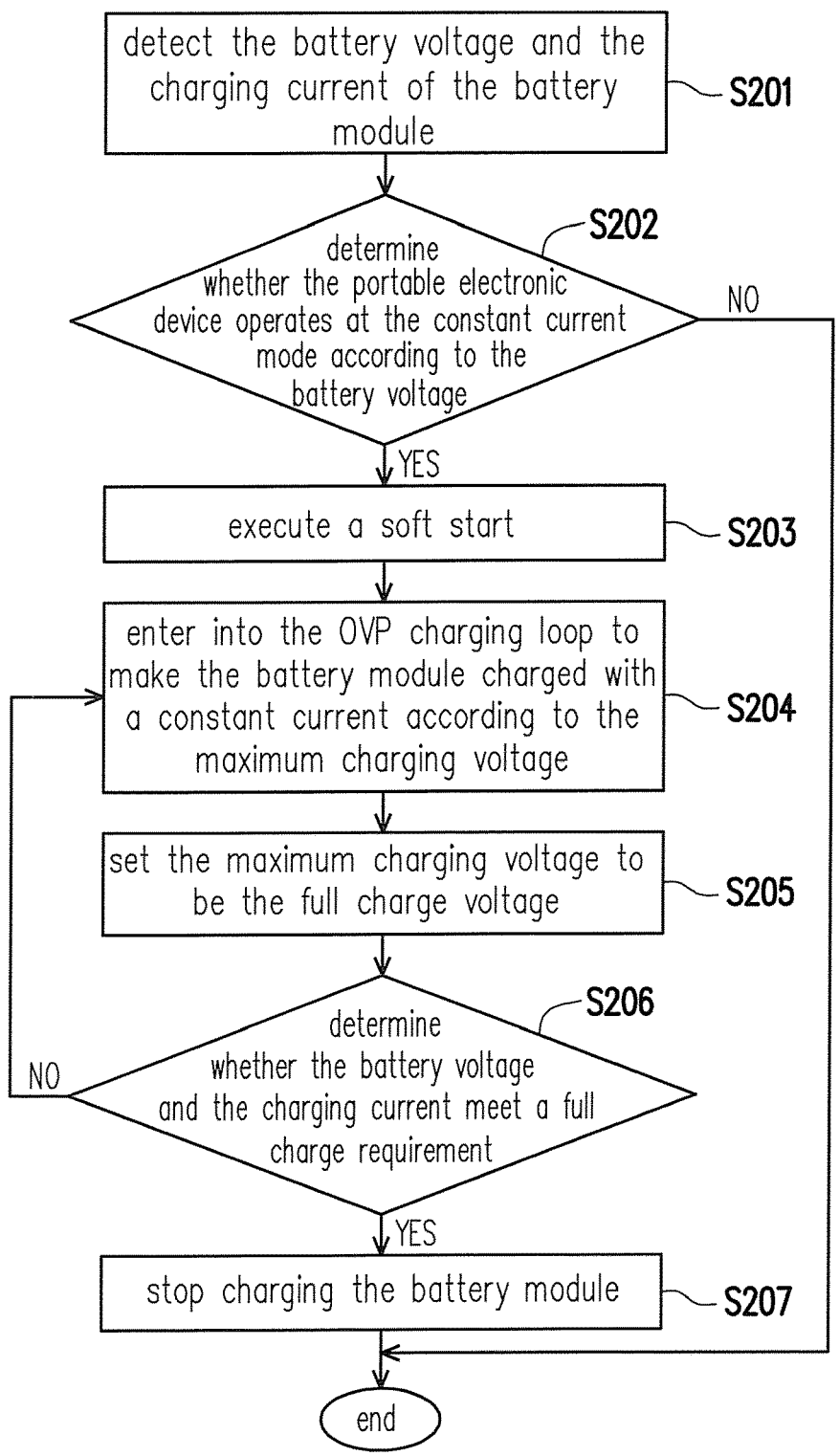
FIG. 2 is a flowchart showing a charging method of a portable electronic device in an embodiment.

The charging control module 130 is used for executing the method in FIG. 2. FIG. 2 is a flowchart showing a charging method of a portable electronic device in an embodiment. As shown in FIG. 1 and FIG. 2, the charging control module 130 detects the battery voltage VBAT and the charging current IBAT of the battery module (step S201) and determines whether the portable electronic device 100 operates at the constant current mode according to the battery voltage VBAT (step S202). When the charging control module 130 determines the portable electronic device 100 does not operate at the constant current mode, that is, the portable electronic device 100 operates at the pre-charge mode, the constant voltage charging mode (CV mode) or the portable electronic device 100 is fully charged. When the charging control module 130 determines the portable electronic device 100 operates at the constant current mode, the charging control module 130 executes a soft start (step S203) to enter into an over voltage protection (OVP) charging loop, and then the battery module 120 is charged with a constant current according to the maximum charging voltage (step S204). In the OVP charging loop, the charging control module 130 gradually decreases the setting value of the maximum charging voltage according to the comparison result between the battery voltage VBAT and the overcharging protection voltage, and then the battery voltage VBAT and the charging current IBAT are decreased gradually and the OVP charging loop is executed until the charging current IBAT is smaller than the predetermined current.

After the OVP charging loop is ended, the charging control module 130 set the maximum charging voltage to be the full charge voltage (step S205), that is, the constant voltage charging mode is entered, the battery module 120 is charged with a constant voltage according to the full charge voltage, and whether the battery voltage VBAT and the charging current IBAT meets a full charge requirement (step S206) is further determined. When the charging control module 130 determines at least one of the battery voltage VBAT and the charging current IBAT does not meet the full charge requirement, the charging control module 130 re-enters the OVP charging loop to execute the constant current charging. In contrast, when the charging control module 130 determines the battery voltage VBAT and the charging current IBAT meets the full charge requirement, that means, the battery module 120 is fully charged, and the charging control module 130 stops charging the battery module 120 (step S207).

As a result, regardless of the value of the actual internal resistance RBAT of the battery module 120, the charging control module 130 makes the charging enters into the constant voltage charging mode when the real voltage VBAT' of the battery module 120 (that is, without consideration of the cross voltage of the internal resistance RBAT) approaches to the full charge voltage by gradually decreasing the setting value of the maximum charging voltage in the OVP charging loop, and then the impedance effect of the internal resistance RBAT is compensated, and the constant current charging for the battery module 120 is longed.

In detail, in the charging method in the embodiment, the control circuit 136 determines whether the battery voltage VBAT is within the preset voltage range (such as in a range between a predetermined lower limit voltage (such as 3V) and the full charge voltage) to determine whether the portable electronic device 100 operates at the constant current mode. When the battery voltage VBAT is in the preset voltage range, the control circuit 136 determines that the portable electronic device 100 operates at the constant current mode. In contrast, when the battery voltage VBAT is out of the preset voltage range, the control circuit 136 determines that the portable electronic device 100 does not operate at the constant current mode.

When the control circuit 136 determines that the portable electronic device 100 operates at the constant current mode, the control circuit 136 executes the soft start to the power switch 134 (step S203) to avoid the inrush current when the power switch 134 switches. Then, the control circuit 136 enters into the OVP charging loop (step S204). The OVP charging loop is further illustrated accompanying with the steps in FIG. 3 and sequence in FIG. 4.

Figure 3:
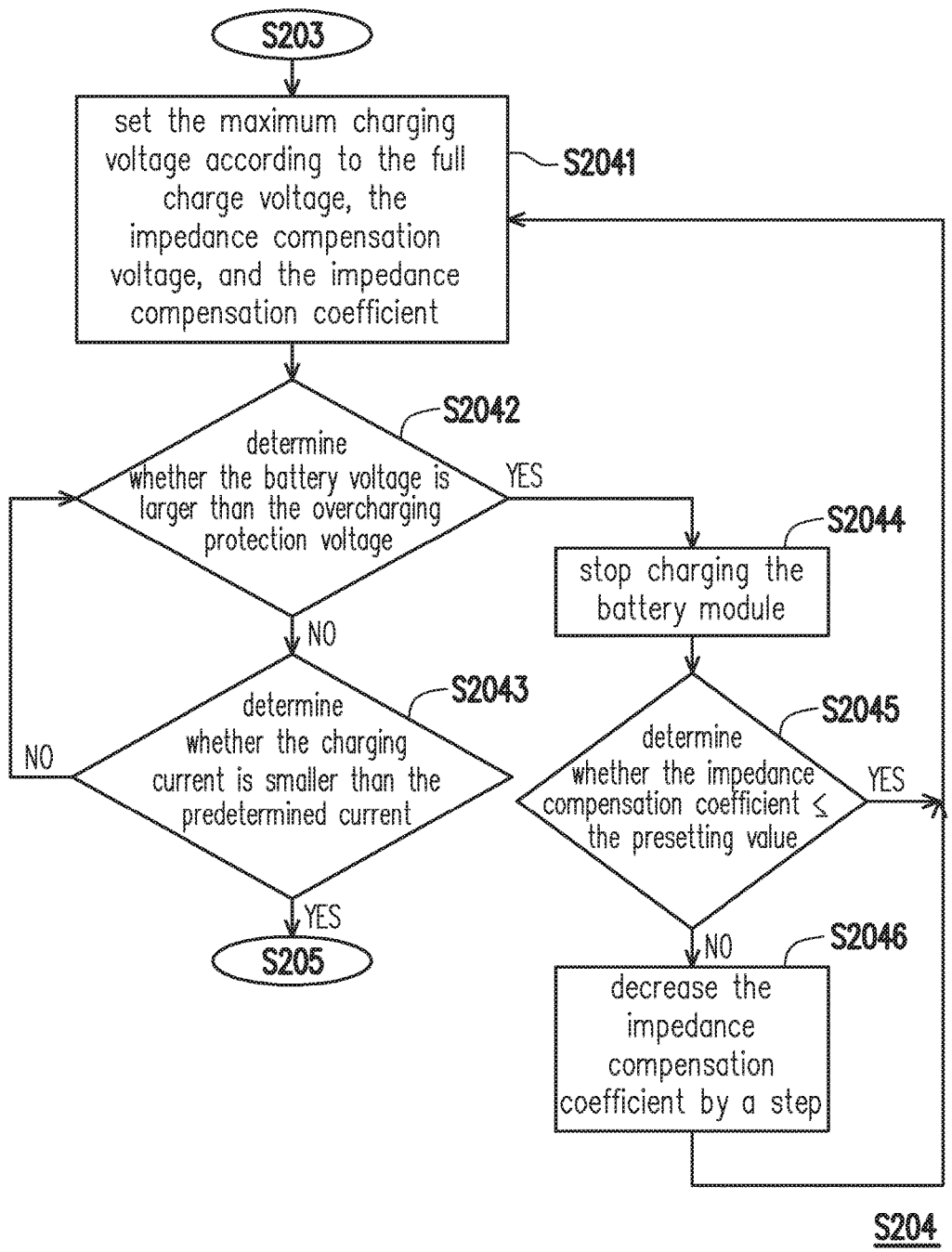
FIG. 3 is a flowchart showing steps of an OVP charging loop executed by a portable electronic device in an embodiment.
Figure 4:
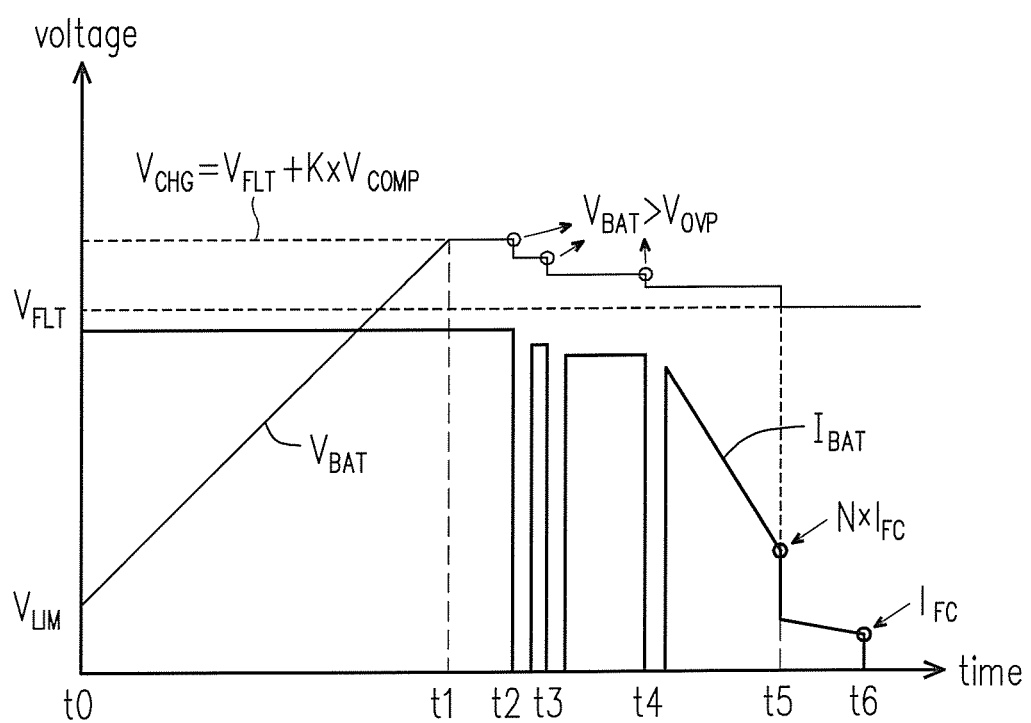
FIG. 4 is a schematic diagram showing a charging sequence of a portable electronic device in an embodiment.

As shown in FIG. 3 and FIG. 4, in the OVP charging loop (step S204), the control circuit 136 sets the maximum charging voltage VCHG according to the full charge voltage VFLT, the impedance compensation voltage VCOMP, and the impedance compensation coefficient K (step S2041). The maximum charging voltage VCHG is represented as:

$$VCHG = VFLT + K \times VCOMP \quad (1)$$

Wherein the impedance compensation coefficient K is set to 1.5 in practical usage, which is not limited herein. In the embodiment, the impedance compensation voltage VCOMP is calculated according to the charging current IBAT and the preset compensation impedance (he preset compensation impedance is set according to the internal resistance RBAT of the battery module 120, which is represented by RSET), which is represented as follows:

$$VCOMP = IBAT \times RSET \quad (2)$$

After the maximum charging voltage VCHG is set, the control circuit 136 controls the power switch 134 conducted and controls the power converting circuit 132 to charge the battery module 120 with a constant current according to the set maximum charging voltage VCHG. At the time, the control circuit 136 continuously detects and determines whether the battery voltage VBAT is larger than the overcharging protection voltage $V_{OVP}$ (step S2042).

As shown in FIG. 4, in a period from time point t0 to t1, since the battery voltage VBAT does not reach the maximum charging voltage VCHG and does not exceed the overcharging protection voltage $V_{OVP}$, the battery voltage VBAT increases from the lower limit voltage VLIM (such as 3V) gradually along with the change of time. Then, in a period from time point t1 to t2, the battery voltage VBAT reaches the maximum charging voltage VCHG, but does not exceeds the overcharging protection voltage $V_{OVP}$. At the time, the control circuit 136 determines whether the charging current IBAT is smaller than the predetermined current (step S2043). The predetermined current is defined as N times of a full charge current IFC, wherein "N" is a coefficient defined by a user (for example, N=4, which is not limited herein).

When the control circuit 136 determines the charging current IBAT is larger than or equals to the predetermined current, the control circuit 136 controls the power converting circuit 132 to continuously charge the battery module 120 with a constant current and determines whether the battery voltage VBAT is larger than the overcharging protection voltage $V_{OVP}$. On the other hand, when the control circuit 136 determines that the battery voltage VBAT is larger than the overcharging protection voltage $V_{OVP}$, the control circuit 136 cuts off the power switch 134 and stops the charging to the battery module 120 (step S2044), and then the control circuit 136 determines whether the impedance compensation coefficient K is smaller than or equal to the presetting value (such as 1) (step S2045).

When the impedance compensation coefficient K is larger than the presetting value, the control circuit 136 decreases the impedance compensation coefficient K by one unit (one unit value is such as 0.1) (step S2046), and then step S2041 is executed to calculate the maximum charging voltage VCHG according to the adjusted impedance compensation coefficient K. As shown in a period from time point t2 to t3, a period from time point t3 to t4, and a period from time point t4 to t5 in FIG. 4, the maximum charging voltage VCHG decreases step by step, and thus the battery voltage VBAT and the charging current IBAT decrease accordingly.

When the impedance compensation coefficient K is smaller than or equals to the presetting value, the control circuit 136 does not decrease the impedance compensation coefficient K, and then step S2041 is executed to set the maximum charging voltage VCHG.

After the impedance compensation coefficient k is decreased gradually, the charging current IBAT of the battery module 120 decreases rapidly when the electric quantity of the battery module 120 reaches a predetermined value (for example, in a period from a time point t4 to a time point t5), and when the charging current IBAT is smaller than the predetermined current, the control circuit 136 determines that the real voltage VBAT' of the battery module 120 reaches the full charge voltage VFLT and sets the maximum charging voltage VCHG to be the full charge voltage VFLT, and then the battery module 120 is charged in a constant voltage charging mode (step S205).

In the constant voltage charging mode, the charging current IBAT also decreases continuously, and the control circuit 136 further determines whether the battery voltage VBAT and the charging current IBAT meet the full charge requirement (step S206). In step S206, the control circuit 136 determines whether the battery voltage VBAT is larger than or equals to the full charge voltage VFLT and determines whether the charging current IBAT is smaller than the full charge current IFC. When the control circuit 136 detects that the battery voltage VBAT is smaller than the full charge voltage VFLT or the charging current IBAT is larger than or equals to the full charge current IFC, the battery module 120 is not fully charged, and the control circuit 136 determines that at least one of the battery voltage VBAT and the charging current IBAT does not meet the full charge requirement, and then step S204 is executed. As shown a period from a time point from t5 to t6, the power converting circuit 132 continuously charges the battery module 120 in the constant voltage charging mode. When the control circuit 136 detects that the battery voltage VBAT is larger than or equals to the full charge voltage VFLT and the charging current IBAT is smaller than the full charge current IFC, which indicates that the battery module 120 is fully charged, the control circuit 136 determines that the battery voltage VBAT and the charging current IBAT meet the full charge requirement, and then the power converting circuit 132 stops charging the battery module 120 (step S207).

Only at an initial period (from a time point t0 to t1) and in a period when the battery voltage VBAT is overcharged and continuously increases to exceed the overcharging protection voltage $V_{OVP}$, the battery voltage VBAT is different from the maximum charging voltage VCHG. As shown in FIG. 4, the time point when the battery voltage VBAT is larger than the overcharging protection voltage $V_{OVP}$ is circled. At the period after the time point t1, the maximum charging voltage VCHG and the battery voltage VBAT are overlapped in FIG. 4.

In sum, a charging method of a portable electronic device and a portable electronic device using the same are provided. In the charging method in embodiments, via the execution of the OVP charging loop, the setting value of the maximum charging voltage is gradually decreased by comparing the battery voltage and the overcharging protection voltage, the constant voltage charging mode is not entered until the real voltage of the battery module approaches to the full charge voltage. As a result, regardless of the actual internal resistance of the battery module, the impedance effect due to the internal resistance is compensated, and thus the constant current charging time to the battery module is lengthened, and the charging efficiency is improved.

Although the disclosure includes been disclosed with reference to certain embodiments thereof, the disclosure is not for limiting the scope. Persons having ordinary skill in the art may make various modifications and changes without departing from the scope of the disclosure. Therefore, the scope of the appended claims should not be limited to the description of the embodiments described above.

What is claimed is:

1. A charging method of a portable electronic device, adapted to charge a battery module of a portable electronic device, the charging method comprising:

detecting a battery voltage and a charging current of the battery module;

determining whether the portable electronic device operates at a constant current mode according to the battery voltage;

entering an over voltage protection charging loop while the portable electronic device operates at the constant current mode and allows the battery module to be charged up at a maximum charging voltage, and leaving the over voltage protection charging loop while the charging current is smaller than a predetermined current, wherein the maximum charging voltage is gradually decreased according to a comparison result between the battery voltage and an overcharging protection voltage; and setting the maximum charging voltage as a full charge voltage while leaving the over voltage protection charging loop.

2. The charging method of the portable electronic device according to claim 1, wherein the step of entering the over voltage protection charging loop while the portable electronic device operates at the constant current mode and allows the battery module to be charged up at the maximum charging voltage, and leaving the over voltage protection charging loop while the charging current is smaller than the predetermined current further includes:

setting the maximum charging voltage according to the full charge voltage, an impedance compensation voltage, and an impedance compensation coefficient;

decreasing the impedance compensation coefficient while the battery voltage is larger than or equal to the overcharging protection voltage, and setting the maximum charging voltage again according to the decreased impedance compensation coefficient, the full charge voltage, and the impedance compensation coefficient; or setting the maximum charging voltage again while the maximum battery voltage is smaller than the overcharging protection voltage; and leaving the over voltage protection charging loop while the charging current is smaller than the predetermined current.

3. The charging method of the portable electronic device according to claim 2, wherein the step of decreasing the impedance compensation coefficient while the maximum charging voltage is smaller than or equal to the overcharging protection voltage and setting the maximum charging voltage as the full charge voltage while leaving the over voltage protection charging loop includes:

stopping charging the battery module;

determining whether the impedance compensation coefficient is smaller than or equal to a presetting value;

decreasing the impedance compensation coefficient by one unit while the impedance compensation coefficient is larger than the presetting value and setting the maximum charging voltage again according to the decreased impedance compensation coefficient, the full charge voltage; and setting the maximum charging voltage while the impedance compensation coefficient is smaller than or equals to the presetting value.

4. The charging method of the portable electronic device according to claim 2, wherein the impedance compensation voltage is calculated according to the charging current and a preset compensation impedance.

5. The charging method of the portable electronic device according to claim 1, further comprising:

determining whether the battery voltage and the charging current meets a full charge requirement;

entering the over voltage protection charging loop again while at least one of the battery voltage and the charging current does not meets the full charge requirement; and stopping charging the battery module while both the battery voltage and the charging current meets the full charge requirement.

6. The charging method of the portable electronic device according to claim 5, wherein the step of determining whether the battery voltage and the charging current meet the full charge requirement includes:

determining whether the battery voltage is larger than or equals to the full charge voltage and determining whether the charging current is smaller than a full charge current.

7. The charging method of the portable electronic device according to claim 1, wherein the step of determining whether the portable electronic device operates at the constant current mode according to the battery voltage includes:

determining whether the battery voltage is within a preset voltage range.

8. The charging method of the portable electronic device according to claim 1, wherein after the portable electronic device is determined to operate at the constant current mode, the charging method further comprises:

executing a soft start before entering the over voltage protection charging loop.

9. A portable electronic device, comprising:

a function module;

a battery module coupled to the function module, configured to charge the function module; and a charging control module coupled to the battery module, configured to charge the battery module, wherein the charging control module detects a battery voltage and a charging current of the battery module and determines whether the portable electronic device operates at a constant current mode according to the battery voltage, while the portable electronic device operates at the constant current mode, the charging control module enters an over voltage protection charging loop and allows the battery module to be charged up at a maximum charging voltage, the charging control module leaves the over voltage protection charging loop while the charging current is smaller than a predetermined current, and the maximum charging voltage is set as a full charge voltage while leaving the over voltage protection charging loop, wherein in the over voltage protection charging loop, the charging control module gradually decreases the maximum charging voltage according to a comparison result between the battery voltage and an overcharging protection voltage.

10. The portable electronic device according to claim 9, wherein the charging control module comprises:

a power converting circuit configured to receive a DC power source and convert the DC power source to an operational power source;

a power switch coupled to the power converting circuit, configured to receive the operational power source and switch according to a control signal to control the operational power source provided to the battery module; and a control circuit configured to control a power switching of the power converting circuit and provide the control signal to control switching of the power switch, wherein the control circuit detects the battery voltage and the charging current of the battery module to control the control signal according to the detected battery voltage and the detected charging current.

11. The portable electronic device according to claim 9, wherein the charging control module sets the maximum charging voltage according to the full charge voltage, an impedance compensation voltage, and an impedance compensation coefficient in the over voltage protection charging loop, and then determines whether the battery voltage is larger than the overcharging protection voltage, while the battery voltage is larger than or equal to the overcharging protection voltage, the charging control module decreases the impedance compensation coefficient to charge the battery module via the corresponding maximum charging voltage.

12. The portable electronic device according to claim 11, wherein while the battery voltage is smaller than the overcharging protection voltage, the charging control module determines whether the charging current is smaller than the predetermined current, while the charging current is smaller than the predetermined current, the charging control module leaves the over voltage protection charging loop, and while the charging current is larger than or equals to the predetermined current, the charging control module re-determines whether the battery voltage is smaller than or equal to the overcharging protection voltage.

13. The portable electronic device according to claim 11, wherein during a period that the charging control module decreases the impedance compensation coefficient, the charging control module stops charging the battery module and determines whether the impedance compensation coefficient is smaller than or equal to a presetting value; while the impedance compensation coefficient is larger than the presetting value, the impedance compensation coefficient is decreased by one unit to re-set the maximum charging voltage to an adjusted maximum charging voltage and charge the battery module via the adjusted maximum charging voltage, while the impedance compensation coefficient is smaller than or equal to the presetting value, the battery module is charged by the maximum charging voltage.

14. The portable electronic device according to claim 11, wherein the charging control module calculates the impedance compensation voltage according to the charging current and a preset compensation impedance.

15. The portable electronic device according to claim 9, wherein the charging control module further determines whether the battery voltage and the charging current meet a full charge requirement.

16. The portable electronic device according to claim 15, wherein the charging control module determines whether the battery voltage is larger than or equals to the full charge voltage and determines whether the charging current is smaller than a full charge current.

17. The portable electronic device according to claim 9, wherein the charging control module determines whether the battery voltage is within a preset voltage range.

18. The portable electronic device according to claim 9, wherein after the charging control module determines that the portable electronic device operates at the constant current mode, the charging control module executes a soft start to enter in the over voltage protection charging loop.

* * * * *